(12) United States Patent
Judey (10) Patent No.: US 11,745,857 B2
(45) Date of Patent: Sep. 5, 2023

(54) AIRCRAFT FORCE-FIGHT MECHANISM

(71) Applicant: Goodrich Actuation Systems SAS, Buc (FR)

(72) Inventor: Jeremy Judey, Lagny-sur-Marne (FR)

(73) Assignee: GOODRICH ACTUATION SYSTEMS SAS, Buc (FR)

( * ) Notice: Subject to any disclaimer, the term of this patent is extended or adjusted under 35 U.S.C. 154(b) by 442 days.

(21) Appl. No.: 17/108,295

(22) Filed: Dec. 1, 2020

(65) Prior Publication Data
US 2021/0171186 A1 Jun. 10, 2021

Related U.S. Application Data

(63) Continuation-in-part of application No. 15/409,808, filed on Jan. 19, 2017, now abandoned.

(30) Foreign Application Priority Data

Mar. 30, 2016 (EP) .................................... 16305368

(51) Int. Cl.
*B64C 13/16* (2006.01)
(52) U.S. Cl.
CPC .................................... *B64C 13/16* (2013.01)
(58) Field of Classification Search
CPC ..... B64C 13/16; B64C 13/503; B64C 13/504; B64C 13/505; B64C 13/50; B64C 13/42; B64C 13/40; Y02T 50/50
See application file for complete search history.

(56) References Cited

U.S. PATENT DOCUMENTS

| | | | | |
|---|---|---|---|---|
| 3,355,993 A | * | 12/1967 | Williamson | ............ F15B 11/22 91/171 |
| 4,120,469 A | * | 10/1978 | Westermeier | ............ G05B 9/03 318/564 |
| 4,420,808 A | * | 12/1983 | Diamond | ................ G01L 5/223 701/4 |
| 5,129,310 A | * | 7/1992 | Ma | ........................... G05D 3/14 91/171 |
| 5,806,805 A | | 9/1998 | Elbert et al. | |
| 6,467,733 B1 | | 10/2002 | Young et al. | |
| 7,970,583 B2 | | 6/2011 | Novis et al. | |

(Continued)

FOREIGN PATENT DOCUMENTS

FR 2983456 A1 6/2013

OTHER PUBLICATIONS

European Search Report for Application No. 16305368.9-1754, dated Sep. 8, 2016, 7 Pages.

*Primary Examiner* — Assres H Woldemaryam
(74) *Attorney, Agent, or Firm* — CANTOR COLBURN LLP (57) ABSTRACT

A force fight mitigation system comprising: control means configured to provide a position command to each of two or more actuators arranged to position a surface, the position command indicative of a desired position of the actuator relative to the surface; means to detect the actual position of the actuator relative to the surface in response to the position command; and means to determine an offset between the desired position and the actual position and to store a rigging correction based on the offset; wherein, for each actuator, an offset is determined for each of three or more desired positions.

4 Claims, 8 Drawing Sheets

(56) References Cited

U.S. PATENT DOCUMENTS

| | | | |
|---|---|---|---|
| 8,245,967 B2 * | 8/2012 | Kirkland | B64C 13/503 |
| | | | 244/76 R |
| 8,534,599 B2 | 9/2013 | Noll et al. | |
| 8,583,293 B2 * | 11/2013 | Soronda | B64C 13/503 |
| | | | 244/99.2 |
| 8,746,625 B2 | 6/2014 | Recksiek et al. | |
| 2007/0164166 A1 * | 7/2007 | Hirvonen | B64C 13/504 |
| | | | 244/175 |
| 2007/0233330 A1 * | 10/2007 | Beutler | G05D 1/0077 |
| | | | 244/175 |
| 2010/0127132 A1 | 5/2010 | Kirkland | |
| 2011/0108671 A1 * | 5/2011 | Soronda | B64C 13/503 |
| | | | 244/195 |
| 2017/0283040 A1 | 10/2017 | Judey | |

\* cited by examiner

AIRCRAFT FORCE-FIGHT MECHANISM

CROSS-REFERENCE TO RELATED APPLICATIONS

This application is a continuation in part of U.S. application Ser. No. 15/409,808 filed Jan. 19, 2017, which claims the benefit of European Application No. 16305368.9 filed Mar. 30, 2016, the disclosures of which are incorporated by reference in their entirety.

TECHNICAL FIELD

The present disclosure relates to systems for mitigating or preventing force fighting between actuators, for example, but not only, in systems for controlling movement of aircraft parts of other vehicle parts.

BACKGROUND

There are many fields in which actuators are used to move moveable parts or components and, for various reasons, two or more actuators may be provided for controlling movement of the same moveable part.

Two or more actuators may be provided to move the same part to provide, for example, redundancy or back-up or to have additional strength or balance, for example over a long part to be driven.

Actuator systems are, as mentioned above, often found in systems for operating aircraft control surfaces, such as ailerons, elevators, flaps, slats, rudders and the like.

Many conventional aircraft systems use hydraulic actuators or servo-hydraulic actuators. More recently, there has been a move towards more electric aircraft (MEA) where more and more of the hydraulic components are being replaced by electrical or electro-mechanical components such as electro-mechanical actuators (EMA) or electro-hydraulic actuators (EHA).

For various reasons, a moveable element such as an aileron in an aircraft may be moved under the action of two or more actuators which may be similar actuators, for example where the moveable part is large and requires actuators distributed along its length, or for redundancy, or it may be that two or more dissimilar types of actuator, e.g. a mix of hydraulic and electrical actuators may be used in the move towards MEA.

Often, where two or more actuators are used to drive a common part, they may be controlled by a common command input and ideally should then provide identical forces to actuate the common driven part simultaneously. A balanced movement of the driven part is often very important, to ensure symmetry.

Conventionally, therefore, actuators, particularly where the actuators are of a similar type, for moving the same part, are designed to be as nearly identical as possible in all respects. Nonetheless, various factors, including different mounting structures or positions, thermal differences, ageing of the parts, for example, can result, despite the same control input, in the actuators having a different actual output position.

This situation can also arise where the actuators are of dissimilar types.

These differences can result in so-called force fighting between the actuators, when the actuators do not position at the same position, and effectively "fight" one another to position the actuator. This can result in a highly undesirable operation which, particularly in the case of aircraft systems, can be crucial.

It is an object of the present disclosure to provide a system to mitigate such force fighting in a multiple actuation system.

SUMMARY

The present disclosure provides a force fight mitigation system comprising: control means configured to provide a position command to each of two or more actuators arranged to position a surface, the position command indicative of a desired position of the actuator relative to the surface; means to detect the actual position of the actuator relative to the surface in response to the position command; and means to determine an offset between the desired position and the actual position and to store a rigging correction based on the offset; wherein, for each actuator, an offset is determined for each of three or more desired positions.

In a preferred embodiment, offsets are determined for a neutral, or 0°, position and for at least one position either side of neutral, such as for the two extremes of the actuator strokes.

The disclosure also provides an actuation system comprising two or more actuators arranged to position a surface, and a force-fight mitigation system as described above.

The disclosure also provides an aircraft surface control assembly comprising a moveable surface and an actuation system as described above.

The disclosure also provides a method of mitigating force-fighting in an actuation system comprising two or more actuators arranged to position a surface; the method comprising determining an offset between a desired position of the actuator relative to the surface and an actual position of the actuator relative to the surface for each actuator for three or more desired positions.

The present disclosure mitigates force fighting between multiple actuators by rigging the actuators.

Preferred embodiments will now be described by way of example only, with reference to the accompanying drawings.

DETAILED DESCRIPTION

The present disclosure provides a passive system for mitigating force fighting between actuators. This is done by electrically rigging the actuators to remove the force fighting effect and also to improve actuator accuracy. The rigging of the present disclosure removes offset and sensibility errors that occur in known systems by providing a three-point (or more than three) rigging system.

The procedure can be performed manually or automatically, where an automatic sequence is determined to obtain the parameters that will correct the position of the actuators. These parameters are calculated in an actuator control electronic (ACE) module.

Figure 1:
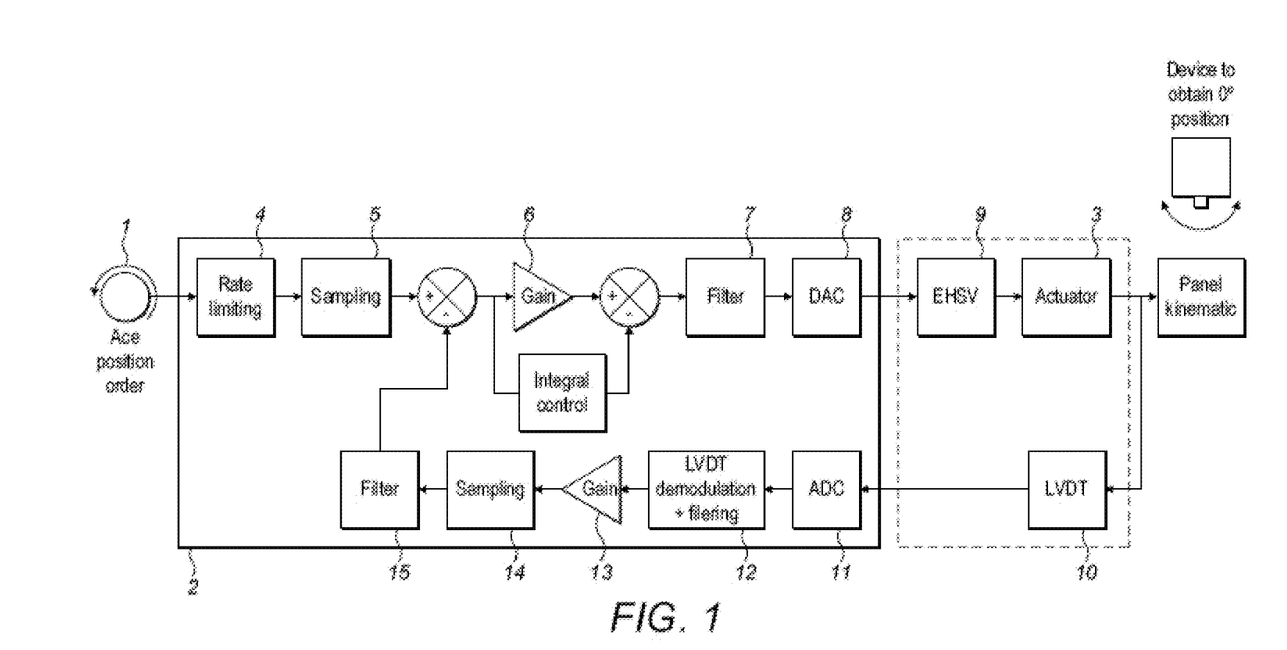
FIG. 1 shows a conventional command chain between actuator control electronics, a remote electronic unit and an actuator.

FIG. 1 shows a conventional command chain between ACE 1, a remote electronic module or unit (REU) 2 and an actuator 3.

The ACE outputs a positioning command signal which is subject to rate limiting 4 and sampling 5. The sampled control signal is then amplified by a gain amplifier and may be filtered by a filter 7 and the resulting signal is then converted to an analog signal by a digital to analog converter 8 in the REU. This signal is then used to control movement of the actuator 3, e.g. via an electro-hydraulic servo valve (EHSV) 9, for a hydraulic actuator or some other form of known actuator. The actuator then co-operates with the component or surface to be moved.

Feedback is provided within the command chain via a linear variable differential transformer (LVDT) 10. The LVDT signal is converted to a digital signal via an analog to digital converter (ADC) 11, is de-modulated, filtered 12, amplified 13, sampled 14 and filtered 15 and then fed back to the REU position control loop to modify the control signal sent to the EHSV.

Whilst in an ideal system, the control command from the REU 2 would be transferred directly to the EHSV 9 of the actuator 3 relative to the part or surface to be moved, in reality, various errors and manufacturing tolerances will affect the actual positioning.

The rigging of the present disclosure aims to provide input data to correct such errors in the command chain and to ensure synchronisation between multiple actuators to mitigate force fighting.

The rigging process of the present disclosure is a three (or more)-point rigging. Thus, a rigging correction is determined based on an offset between the desired actuator position and the actual actuator position for at least three different desired positions, e.g. for the neutral position and for the two extremities of actuator stroke (or the maximum and minimum actuator positions).

The procedure at the neutral position is so-called "normal rigging".

The synchronisation of the rigging procedure (i.e. at the points either side of neutral) has the purpose of compensating the REU and LVDT sensibility and some of the non-linearity errors as well as the errors on the structure kinematics to reduce the force fight between the actuators.

The rigging aims to harmonize the position electrical data delivered to the ACE and/or REU with the real mechanical position of the surface, by applying corrections to the ACE command and/or to the REU LVDT feedback to match the actual position with the desired positions.

Figure 2:
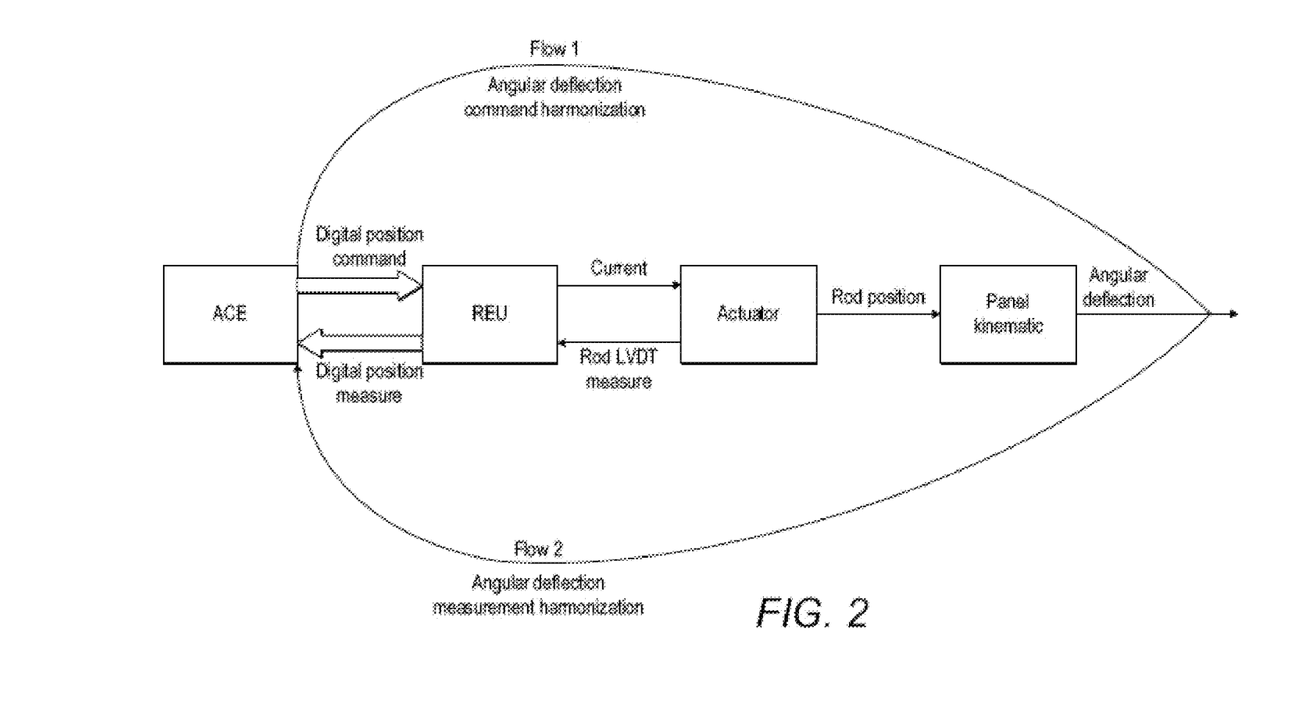
FIG. 2 is a schematic flow diagram showing rigging compensation.

This can be seen from the schematic diagram in FIG. 2. As can be seen, a digital position command is sent to the actuator; the actual position, or angular deflection is measured and fed back to determining a rigging correction.

Rigging in this way synchronizes the active actuators in the case of a surface dual control to minimise force fighting.

According to the disclosure, and as shown in the drawings, force fighting in an aircraft actuation system having two or more actuators 19, 20, 21 arranged to position a surface 22 of the aircraft, is mitigated by determining an offset between a desired position of the actuator 19, 20, 21 relative to the surface 22 and an actual position of the actuator 19, 20, 21 relative to the surface 22 for each actuator for three or more desired positions.

Determining the offset includes selecting #3 one of said two or more actuators 19 and setting the non-selected actuator 20, 21 to a non-operative by-pass mode (#4), the selected actuator of said two or more actuators being active. A first, normal rigging step is performed, including commanding the selected actuator to position the surface to a desired neutral position #5, measuring the actual position of the surface and comparing the actual position to the desired neutral position, adjusting #6 the actuator until the surface is at the desired neutral position and storing #8 the amount of adjustment of the actuator as a first rigging parameter 190. A second synchronization step (FIG. 6, Yes) is performed, including commanding the selected actuator to position the surface at a second position above or below the neutral position, measuring the actual position of the surface and comparing the actual position to the second position, and further adjusting the actuator until the surface is at the second position. The amount of adjustment of the actuator required to bring the surface to a second position is stored as a second rigging parameter 191. The actuator is commanded to position the surface at a third position below or above the neutral position, on an opposite side of the neutral position to a second position. The actual position of the surface is measured and comparing the actual position to the third position. The actuator is further adjusted until the surface is at the third position, and the amount of adjustment of the actuator required to bring the surface to the third position is stored as a third rigging parameter 192. The above steps are repeated for each other actuator 20, 21, and the actuation system is controlled with a compensation factor based on the first, second and third rigging parameters.

Some specific, non-limiting examples will now be described in more detail. The examples described are all in aircraft, but the techniques of the disclosure are applicable to any field where multiple actuators can experience force-fighting.

One example of multiple actuators is in the control of ailerons or elevators. These moveable parts are positioned by actuators and usually have two or more actuatrs to provide symmetry and/or redundancy. Examples will be described of dual actuator systems using an electro-hydraulic servo actuator (EHSA) and an electro-hydraulic actuator (EHA) or an electro back-up Hydraulic actuator (EBHA), with reference to FIG. 3.

Figure 3:
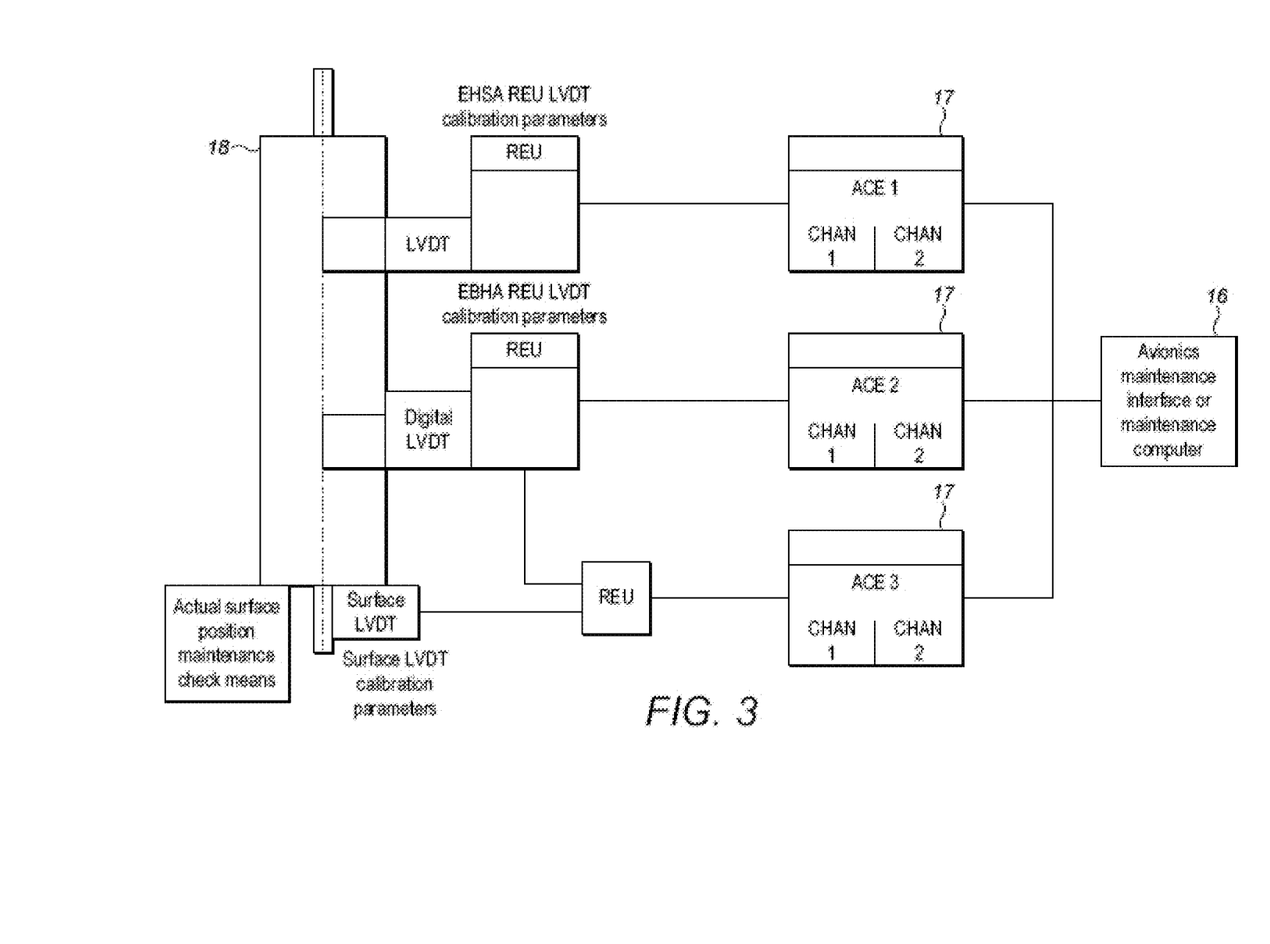
FIG. 3 is a block diagram of a rigging apparatus.

A central computer or control 16 provides commands to respective actuator controls 17 to control the position of the respective actuators which, in turn, position the aileron surface 18. Respective calibration parameters are determined based on a comparison between the commanded position and the actual position for three (or more) different positions.

In one example, ailerons and elevators are controlled by an EHSA and an electrical back-up hydraulic actuator (EBHA) at the same time.

For these surfaces, the rigging concept is based on two steps:

Step 1: During a rigging procedure, the operator performs a normal rigging on two actuators and the surface LVDT. This procedure is based on only one surface reference position: the neutral surface position.

Step 2: During the rigging second stage, the operator performs a synchronization process. This process is applied on one actuator in by-pass mode and on the surface LVDT.

This step is based on two actuator reference positions to synchronize the second actuator and the surface LVDT on the first one.

The step 2 can also be done using an external device. In this case, the procedure is the same as for step 1 and is also a normal rigging.

In step 1 (called normal rigging), the offset correction is computed from the surface neutral position and the gains errors are not corrected.

In step 2 (called synchronization), the offset errors are corrected in the procedure step 1.

Figure 8:
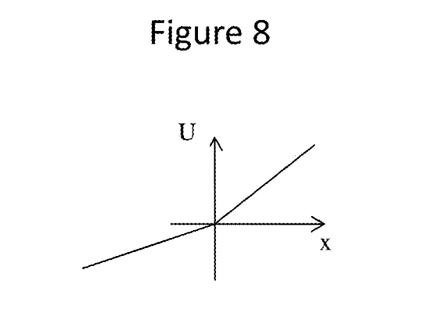
FIG. 8 is a schematic view of a portion of a rigging procedure.

To synchronize, the gain is corrected as follows (no offset correction on the scheme), with one correction for the gain upper part and one correction for the gain lower part as schematically illustrated in FIG. 8.

Figure 9:
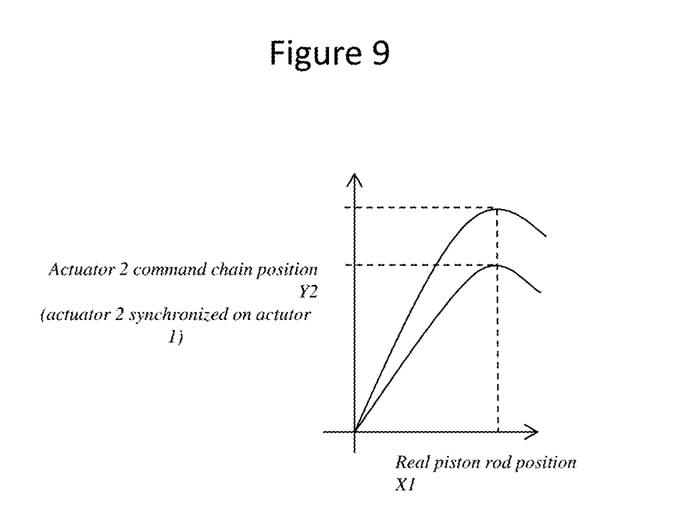
FIG. 9 is a schematic view of another portion of a rigging procedure.

For each correction, the gain is corrected as illustrated in FIG. 9, where the gain correction is Y1/Y2.

After the rigging procedure, the ACE shall check that gains and offset corrections are within a given range and the rigged position is still monotonic.

The rigging can also be done automatically (auto-rigging) using an already rigged actuator on the surface.

In more detail, for this example, the actuator normal rigging procedure is detailed as follows:

Actuator setting on the neutral surface position (surface reference position).

Two operators are necessary for this operation.

From the cockpit, the first mechanic performs an aileron/elevator rigging:

he details the location of the actuator to rig, the actuator type and the rigging type (normal rigging/synchronization/auto-rigging). The maintenance mode configures the control surface in the active/by-pass mode configuration with the actuator to rig in by-pass mode. In case of two actuators replacements on a same surface, one actuator, chosen randomly, is in by-pass mode.

Then, he adjusts the control surface by means of fine and coarse position commands increments with the actuator in active mode.

The second mechanic checks the surface control position:

With a gage-depth installed on the top of the control surface, he measures the distance between the top of the control surface and the wing fixed part (or the visual reference on the aircraft).

He gives to the first mechanic the correct surface position adjustment until the measured distance is included in the tolerances.

Once the surface neutral position is visually checked, the EHSA and EBHA piston rod LVDT measures (L0) and the surface LVDT measure (L'0) are the values of the offsets stored in ACE for the correction of the position.

The first mechanic, through the rigging mode, resets the rigging parameters and records these L0 values into the ACE.

The temperature input data is not necessary for this rigging procedure but can be taken into account for more rigging precision.

At this step, the EHSA, EBHA and surface LVDT shall be synchronized to avoid force fighting.

The synchronization process shall take into account the three LVDTs present on the surface: EHSA, EBHA and surface LVDT.

This step cannot be performed without first performing the previous one (the normal rigging). One mechanic is necessary for this operation.

The synchronization process is based, in this example, on the record of two new reference positions for the actuator to rig, e.g.:

80% of the LVDT stroke in a upper position of the actuator in active mode.

80% of the LVDT stroke in a lower position of the actuator in active mode.

Of course, values other than 80% can be used.

The temperature input data does not need to be taken into account in this procedure (can be taken into account for more precision).

The synchronization process is detailed as follows:

From the cockpit, the mechanic continues to manage the rigging mode (control surface configuration in the active/by-pass mode with the actuator to rig in by-pass mode. In case of two actuator replacement on a same surface, one actuator, chosen randomly, is in by-pass mode):

The rigging mode commands the actuator in active mode to reach from the surface neutral position to e.g. 80% of its LVDT stroke in the upper position.

The rod LVDT measure (L1) of the actuator in by-pass mode and the surface LVDT measure (L'1) are the values of the synchronization parameter stored for the correction of the synchronized position.

The rigging mode resets the rigging parameters and records the L1 and L'1 values through the rigging process.

Then, the rigging IBIT mode commands the actuator in active mode to reach from this upper position to e.g. 80% of its LVDT stroke in the lower position.

The rod LVDT measure (L2) of the actuator in by-pass mode and the surface LVDT measure (L'2) are the values of the synchronization parameter stored for the correction of the synchronized position.

The rigging mode resets the rigging parameters and records this L2 and L'2 values through the rigging process.

Another example where multiple actuators control the position of a moveable part is the rudder of an aircraft (triplex surface). A triplex actuator system for a rudder is described with two EHSAs and one EHA.

In this example, the rudder is controlled by the two EHSAs at the same time. The EHA is in by-pass mode.

The rudder actuator rigging procedure in case of actuator replacement is similar to the aileron/elevator rigging procedure. The configuration mode changes and the surface LVDT function is performed by the EHA LVDT.

Step 1: Through the rigging mode, the operator details the location of the actuator to rig, the actuator type and the rigging type (normal rigging/synchronization/auto-rigging).

In case of one EHSA replacement, the rigging mode configures the control surface in the active/by-pass/by-pass mode configuration with the actuator to rig in by-pass mode.

In the other cases (EHA replacement, two rudder EHSA replacements or every actuator replacements), one EHSA, chosen randomly, is configured in active mode.

The operator performs, through the rigging mode, the rigging procedure described above.

Step 2: normal rigging procedure of the actuators (EHSAs and EHA).

Step 3: Synchronization process.

The surface LVDT function is performed by the EHA LVDT in the case of the rudder.

The control surface configuration is similar to the previous step.

Figure 4:
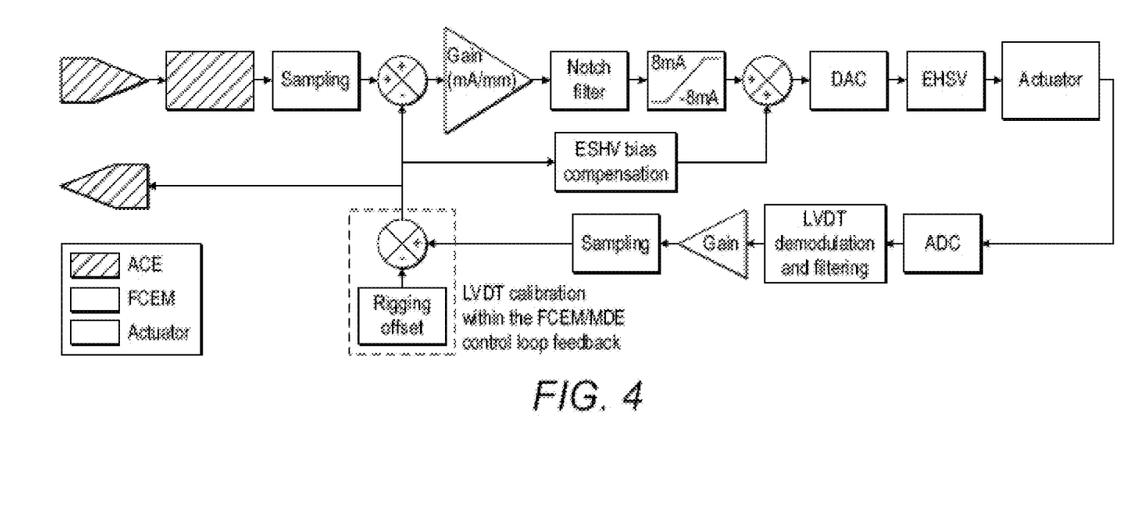
FIG. 4 is a block diagram of alternative compensation systems.

Preferably, the rigging correction is applied to the command sent from the ACE when the command signal conditioning (position rate limiter and possibly conversion from degree to mm) is performed. An example is shown in FIG. 4.

The ACE command as well as the LVDT feedback are altered.

Alternatively, the correction can be applied as part of the LVDT measurement process (in the REU control loop feedback)

Figure 5:
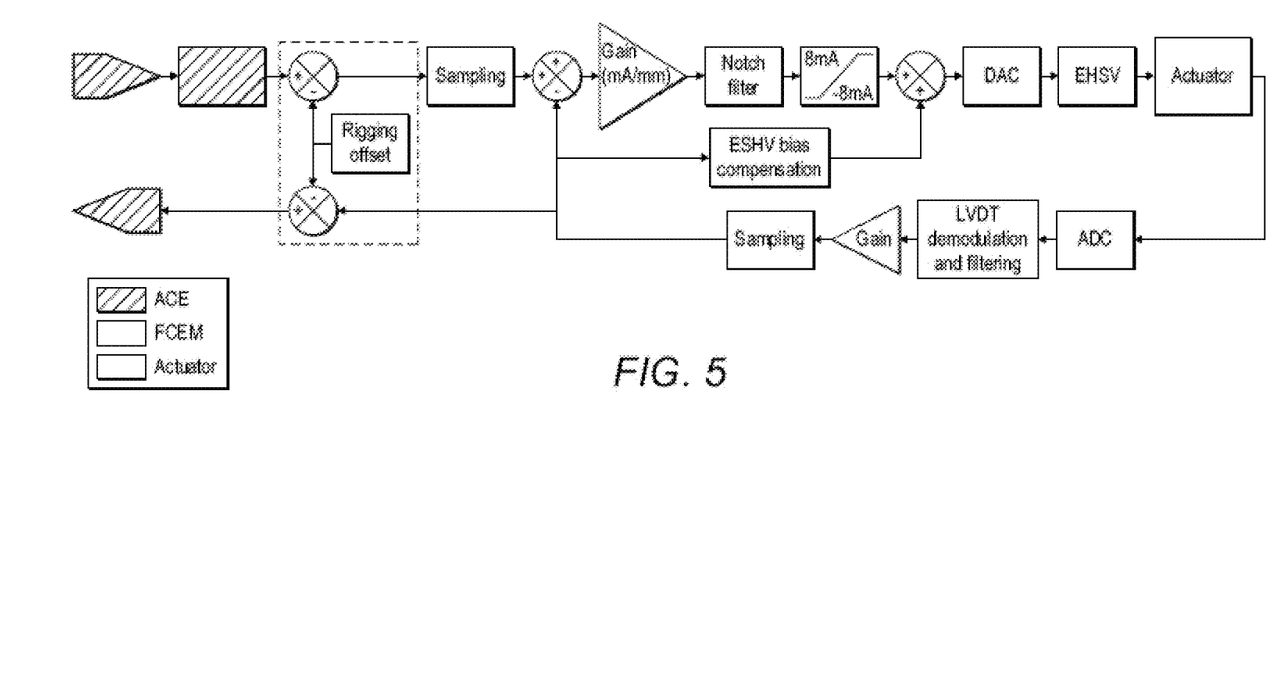
FIG. 5 is a block diagram of alternative compensation systems.

Preferably, the ACE will send an "altered command". This could be done when the command signal conditioning (position rate limiter and possibly conversion from degree to mm) is performed. This example is shown in FIG. 5.

Figure 6:
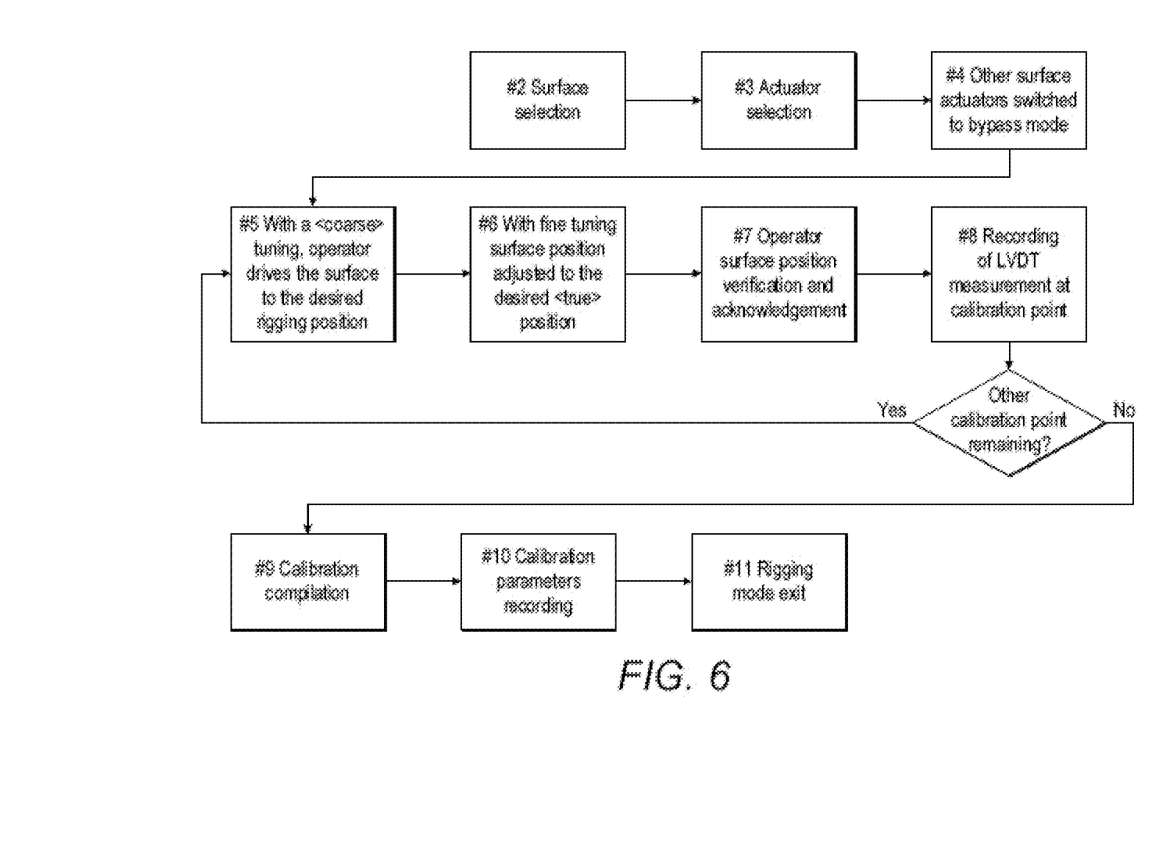
FIG. 6 is a flow diagram of a rigging procedure.

A more general description of the rigging process follows with reference to FIG. 6.

First, the control system is switched to maintenance mode and rigging submode. The surface (Aileron Left/Right, Rudder, Elevator Left/Right, Spoiler) of interest is then selected by the operator. The specific actuator to rig is also selected by the operator. Other actuators on the surface are switched to bypass mode. Using the maintenance interface, the operator roughly tunes the surface to the calibration position. Through a fine tuning command and a maintenance position indicator, the operator then adjusts the surface position to the desired true position. The operator validates that surface has reached the calibration position.

The LVDT measurement at the calibration position is stored within the system until calibration curves/offset computation. These steps are repeated on several positions depending on the calibration process complexity.

The calibration (correction) gains/offset is computed and verified, and the calibration parameters are sent to the REU and/or FCCs for recording. The rigging submode is then turned on.

Figure 7:
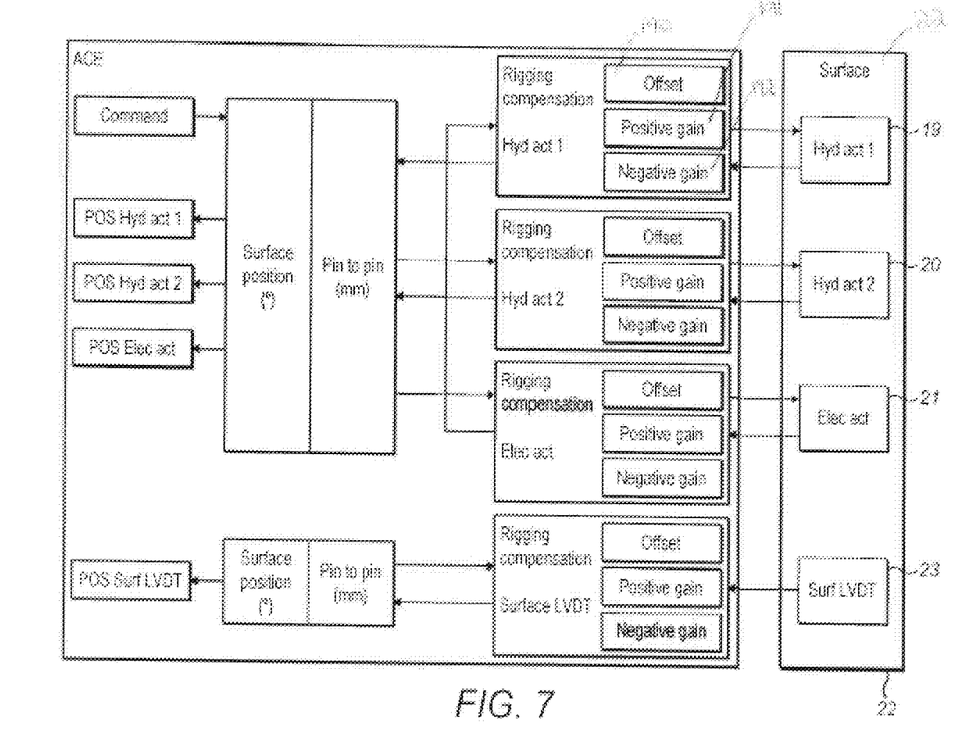
FIG. 7 is a schematic system diagram of a rigging apparatus.

FIG. 7 is a block schematic showing an example of rigging compensation, where three actuators (in this example, two hydraulic actuators 19, 20 and an electric actuator 21) are provided to position a surface 22.

For each actuator, a rigging compensation is performed in three different positions, shown here as offset, positive gain and negative gain. Whilst each actuator is being calibrated, the others are in bypass mode. A command for the respective position is sent via the ACE 1. The actual surface position is determined via the LVDT 23 and a rigging compensation factor is generated based on the difference between the commanded position and the actual position, for each of the three positions and for each actuator.

With a low integrity unit (such as REU), monitoring of the rigging correction function may be difficult to achieve, whereas with a rigging correction implemented in ACE (Upper level system), the high integrity would permit detection of error or failure.

The invention claimed is:

1. A method of mitigating force-fighting in an aircraft actuation system comprising two or more actuators arranged to position a surface; the method comprising determining an offset between a desired position of the actuator relative to the surface and an actual position of the actuator relative to the surface for each actuator for three or more desired positions;
wherein determining the offset includes:
selecting one of said two or more actuators and setting only the selected actuator to a non-operative by-pass mode, the other actuators of said two or more actuators being active;
performing a first, normal rigging step, including:
commanding the other actuators to position the surface to a desired neutral position;
measuring the actual position of the surface, said measurement including a measurement of an amount of adjustment at a piston rod of the selected actuator, and comparing the actual position to the desired neutral position;
adjusting the other actuators until the surface is at the desired neutral position;
storing the amount of adjustment of the selected actuator as a first rigging parameter;
performing a second, synchronization step, including:
commanding the other actuators to position the surface at a second position above or below the neutral position;
measuring the actual position of the surface, said measurement including a measurement of an amount of adjustment at the piston rod of the selected actuator, and comparing the actual position to the second position;
further adjusting the other actuators until the surface is at the second position;
storing the amount of adjustment of the selected actuator required to bring the surface to a second position as a second rigging parameter;
commanding the other actuators to position the surface at a third position below or above the neutral position, on an opposite side of the neutral position to the second position;
measuring the actual position of the surface, said measurement including a measurement of the amount of adjustment at the piston rod of the selected actuator and comparing the actual position to the third position;
further adjusting the other actuators until the surface is at the third position;
storing the amount of adjustment of the selected actuator required to bring the surface to the third position as a third rigging parameter;
repeating the above steps for each other actuator; and
controlling the actuation system with a compensation factor based on the first, second and third rigging parameters.

2. The method of claim 1, wherein the second and third positions either side of the neutral position correspond substantially to two extremes of actuator stroke.

3. An actuation system comprising two or more actuators arranged to position a surface, and a force-fight mitigation system arranged to operate according to the method of claim 1.

4. An aircraft surface control assembly comprising a moveable surface and an actuation system as defined in claim 3.

* * * * *